H. JANDER.
BAKING OVEN.
APPLICATION FILED DEC. 22, 1916.
1,244,502.
Patented Oct. 30, 1917.
4 SHEETS—SHEET 2.
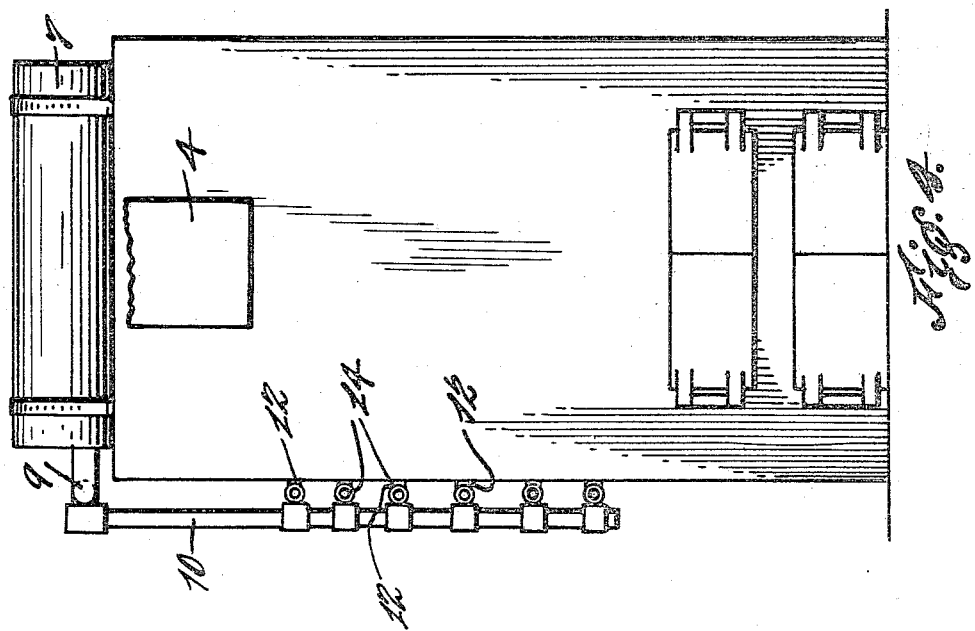
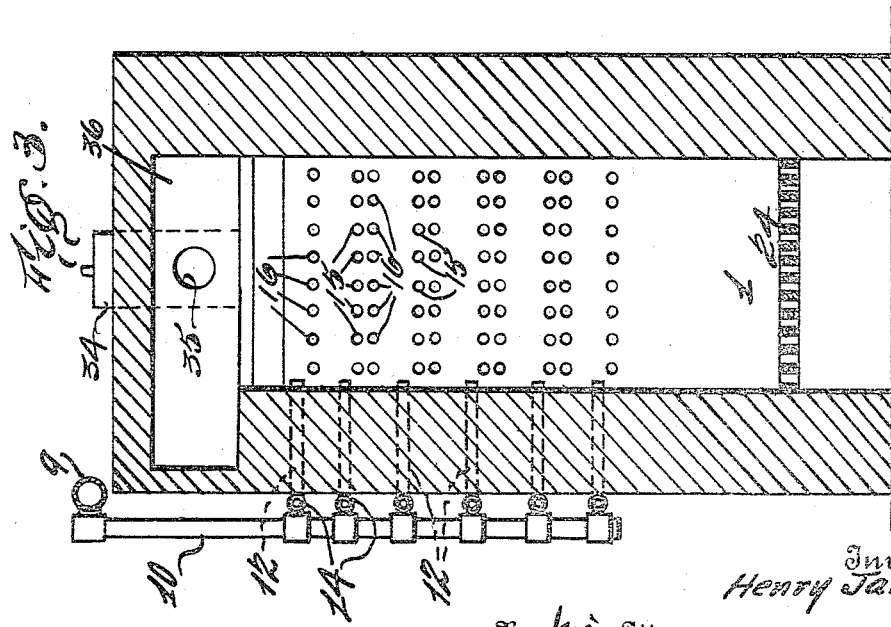
Inventor
Henry Jander
By his Attorney

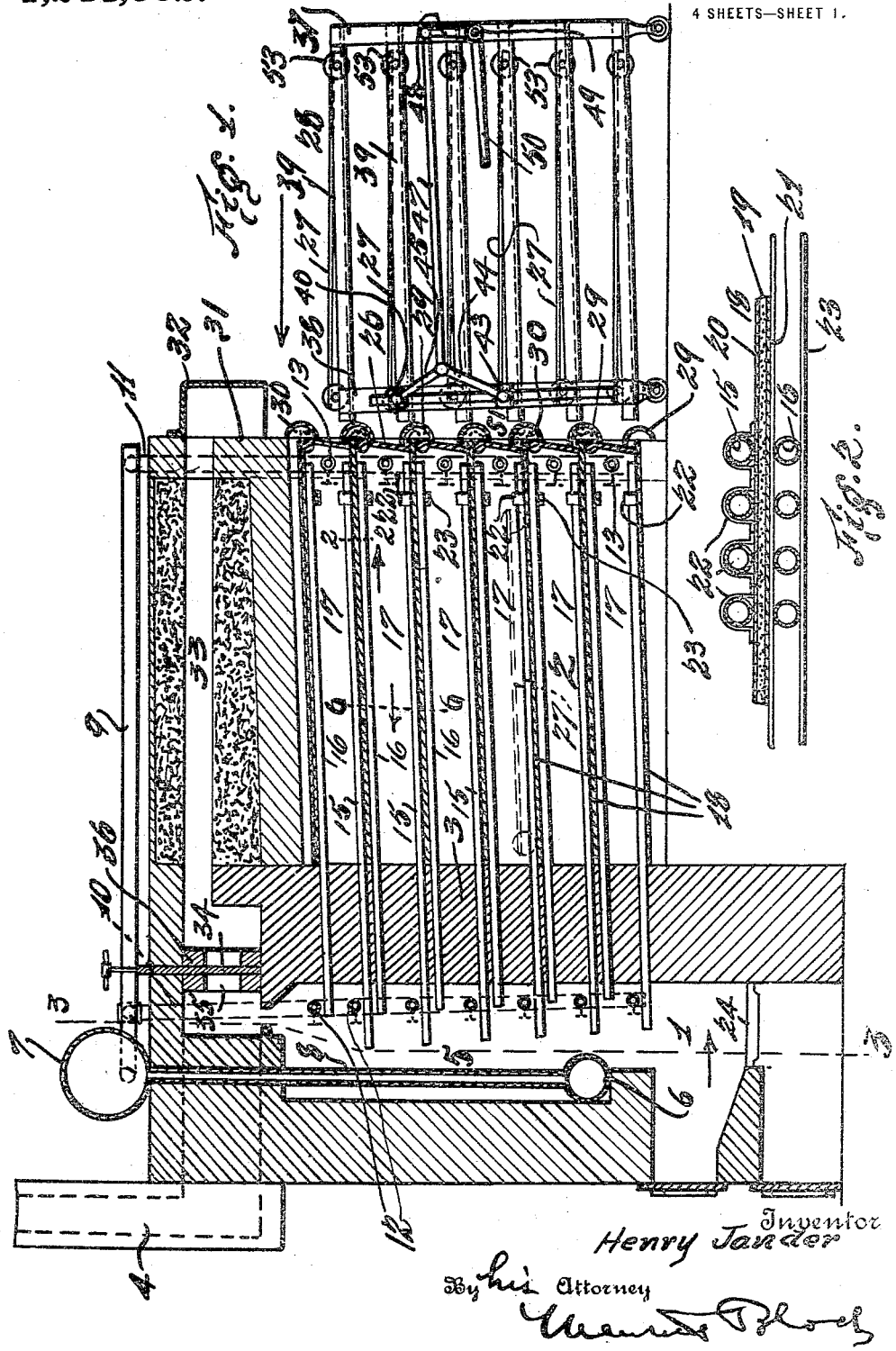

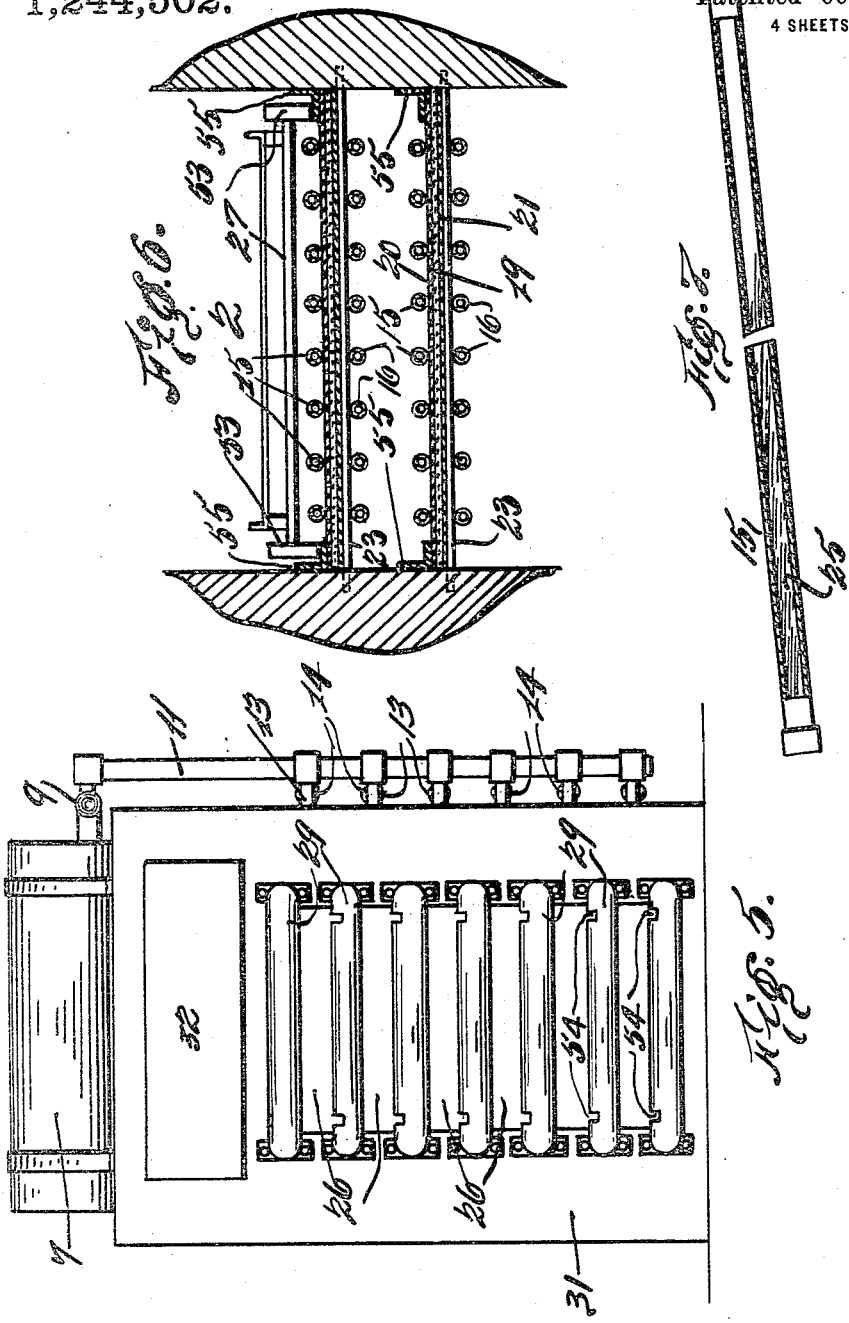

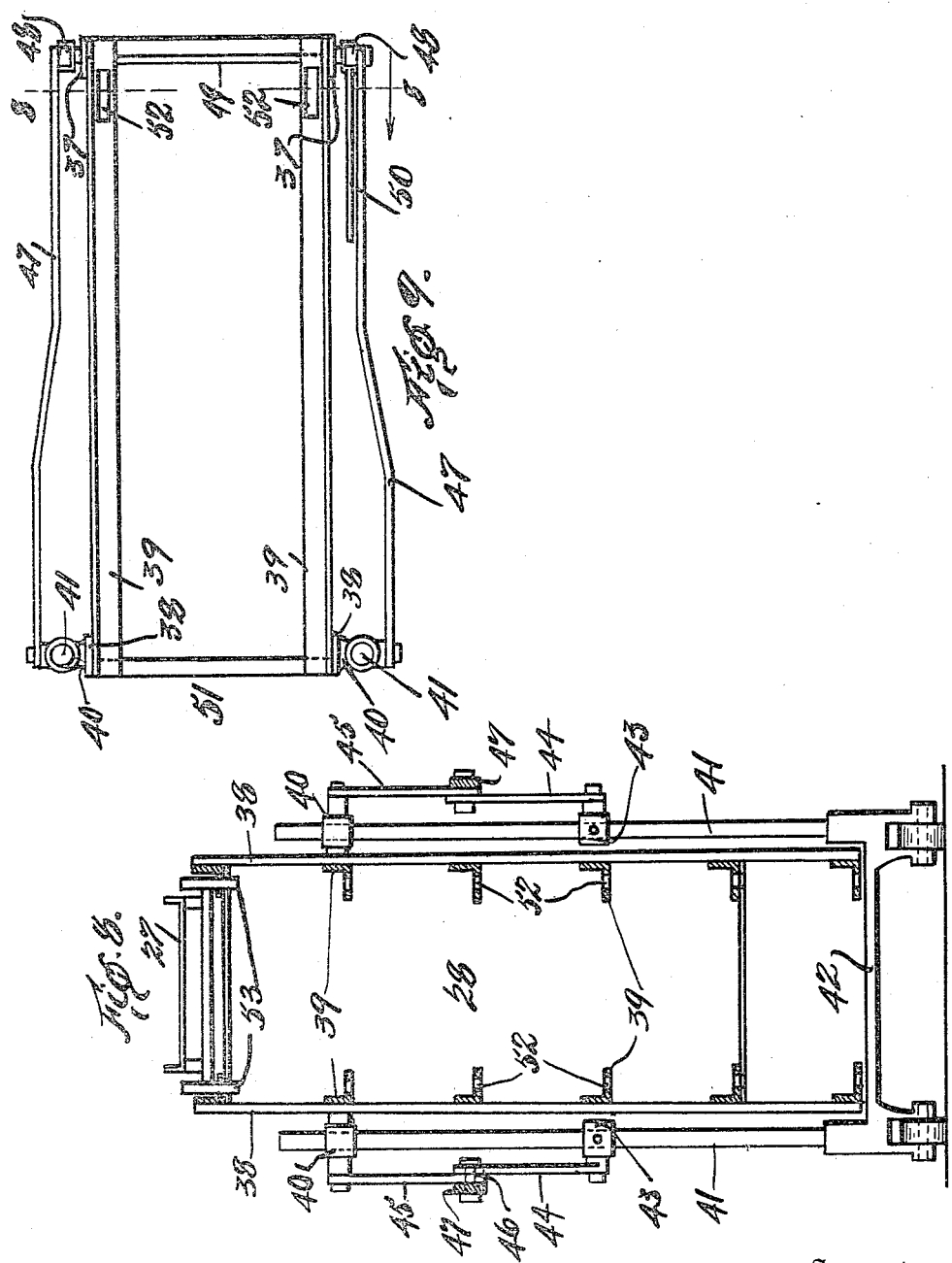

UNITED STATES PATENT OFFICE.

HENRY JANDER, OF BROOKLYN, NEW YORK.

BAKING-OVEN.

1,244,502. Specification of Letters Patent. Patented Oct. 30, 1917.

Application filed December 22, 1916. Serial No. 138,355.

*To all whom it may concern:*

Be it known that I, HENRY JANDER, a citizen of the United States of America, residing at Brooklyn, Kings county, and State of New York, have invented certain new and useful Improvements in Baking-Ovens, of which the following is a full, clear, and exact description.

This invention relates to bake ovens of the kind in which the baking chamber receives its heat from fluid heated by the action of combustion, the baking being therefore caused by transmitted heat. The said invention consists in certain improvements in the heating means and other features of the oven substantially as hereinafter more particularly set forth and claimed.

I will now proceed to describe my invention in detail, the novel features of which I will point out in the appended claims, reference being had to the accompanying drawings, forming part hereof, wherein:—

Figure 1 is a longitudinal sectional view of my improved oven, the portable truck being also illustrated;

Fig. 2 is an enlarged cross sectional detail view, the section being taken on a line 2—2 in Fig. 1;

Fig. 3 is a vertical sectional view, the section being taken on a line 3—3 in Fig. 1;

Fig. 4 is an end elevation, looking from the left in Fig. 1;

Fig. 5 is a similar view, looking from the right in Fig. 1, the truck being omitted;

Fig. 6 is an enlarged cross sectional detail view, the section being taken on a line 6—6 in Fig. 1, a carrier being illustrated as located within the oven;

Fig. 7 is an enlarged sectional detail view, partly in elevation, of one of the water receptacles;

Fig. 8 is an enlarged cross-sectional detail view of the portable truck, the section being taken on a line 8—8 in Fig. 9; and Fig. 9 is a plan view thereof.

As herein embodied, my invention consists of a baking oven comprising a fire-box 1 and a chamber 2, which constitutes the oven proper. The firebox and chamber are separated by a wall or partition 3 and are in no way placed in direct communication. The firebox communicates with a suitable stack 4, as can be seen in Fig. 1.

Within the firebox 1, I locate a water tubular boiler 5, consisting of the mud-drum 6, steam chamber 7 and a plurality of vertical tubes 8, one only being illustrated. To the steam drum 7 I connect one end of a manifold or duct 9 having depending branches 10 and 11, which in turn are provided with nozzles 12 and 13, respectively (see Figs. 3, 4 and 5), each nozzle being provided with a valve 14. The valve-controlled nozzles 12 serve to direct a steam jet onto the projecting ends of water receptacles 15 and 16 to blow ashes thereoff in order to keep same clean. The valve-controlled nozzles 13 serve to introduce steam into the compartments 17 of the chamber 2.

To form the compartments 17, I provide horizontally disposed shelves or partitions 18 made up of a layer of asbestos 19 between sheet-iron plates 20 and 21 (see Fig. 2). The shelves or partitions 18 serve to divide the chamber 2 into the said compartments 17. Furthermore, the said compartments are insulated one from the other by the layers 19 of asbestos. Each compartment 17 contains a long receptacle or pipe 15 and a short receptacle or pipe 16, the longer one being located at the bottom of the compartment. Each receptacle 15 is clamped down by a stirrup or strap 22 (see Fig. 2) to keep it from warping. The receptacles 16 may lie upon crossbraces 23.

In order to maintain, as far as possible, an even heat in each of the compartments 17, I arrange the receptacles 15 and 16 as illustrated in Fig. 1. In other words, all of the receptacles do not project into the firebox to the same extent. As can be seen, the lower receptacles do not extend into the firebox as far as the top receptacles; this is because they are nearer the fire on the grate 24 and do not need as much of an exposed surface as those farther from the fire. The amount of exposed surface of a receptacle 15 or 16 is dependent upon its location relative to the fire. I desire, as far as possible, to keep the area of the exposed portion of each receptacle proportionate to the location of the said receptacle relative to the fire, in order that the water, (indicated by 25 Fig. 7) will be heated to about the same extent in all of the receptacles 15. As can be seen, the top receptacles 16 do not extend into the firebox as far as the receptacles 15; hence, the water will not be heated to the same extent. I do not desire to have the upper portion of the compartment heated to the same extent as the lower portion. To gain this result, I do not expose as much of the said receptacles to the action of the fire.

The front end of each compartment 17 is provided with a hinged door 26 arranged to swing inwardly to permit of the introduction of wheeled trays 27 carried by a portable truck 28. The trays 27 support the articles to be baked, such as bread, cake or the like.

To prevent the heat in one compartment 17 from escaping into another, I provide seals 29, which are convexed and contain a packing, such as mineral-wool or asbestos 30 (Fig. 1). The seals are secured at each end thereof to the front wall 31 of the oven and are located so as to contact with the doors 26 when said doors are closed and to straddle the shelves or partitions 18, thereby completely sealing the joints.

To carry off the vapors from the compartments when the doors are opened to remove any of the trays, I provide a hood 32 which communicates with a flue 33, which in turn communicates with the stack 4 when the damper 34 is opened or raised to open the passage 35 in the partition wall 36. The damper 34 will be raised only when it becomes necessary to carry off the vapor from the compartments 17.

The compartments 17 are heated by steam within the receptacles 15 and 16. As can be seen, the receptacles 15 and 16 are inclined toward the firebox in order that the water 25 will remain at the heated end of said receptacles.

In combination with my improved oven, I employ the portable truck 28 which carries the trays 27. The truck consists of the vertical frame-members 37, 37, 38, 38, connected by angle-iron rails 39, upon which the trays roll. The frame-members 38 carry blocks 40 which slidably engage posts 41 carried by the wheel-frame 42. Each post 41 has secured thereto a block 43, to which is pivotally connected one end of a toggle-member 44, the other toggle-member 45 being connected, at one of its ends, to the block 40 on the truck-frame members 38, the free ends of the said toggle-members being connected at 46. Links 47 are connected to said toggle-members at the points 46, the other end of said links being connected to arms 48 carried by a shaft 49. A lever 50 is employed to actuate said shaft to cause the toggle-members 44 and 45 to operate to raise or lower the end 51 of the truck 28.

One end of each rail 39 is provided with an opening 52 for the wheels 53 of the trays 28 to drop into in order that the trays will be locked against movement while the truck is being moved from place to place. When the truck is to be moved the toggles 44 and 45 will be operated to raise the end 51 of the truck. Fig. 1 illustrates the said end 51 of the truck lowered, the toggles being out of alinement. When the toggles are brought into alinement the said end 51 of the truck will be in raised position and may be moved. When a tray is rolled off the truck, the wheels thereof will pass through slots 54 in the seals 29 onto rails 55 on the side-walls of the chamber 2 (see Fig. 6).

Having now described my invention, what I claim and desire to secure by Letters Patent is:—

1. A baking oven consisting of a firebox, a baking chamber adjacent thereto but out of communication therewith, and receptacles for water within said chamber and extending into said firebox, the said receptacles including a pair, of which the lower receptacle is the longer and has the greater extent of surface exposed to the direct action of the heat.

2. A baking oven consisting of a firebox, a baking chamber adjacent thereto but out of communication therewith, and receptacles for water within said chamber and extending into said firebox, said receptacles consisting of superposed pairs, the lower receptacle of each pair having a greater part of it exposed to the direct heat of the fire-box than has the upper receptacle of said pair.

3. In a baking oven, a firebox, a baking chamber adjacent to said firebox, and receptacles for fluid located in said chamber and extending into said fire-box, said receptacles consisting of superposed pairs, the lower members of which increase in upward order in the length exposed to the fire, the upper member of each pair being less in length than its lower member and the said baking chamber being composed of a series of compartments, each of which contains one of said pairs of receptacles.

4. In a baking oven, a baking chamber divided into superposed compartments, means for individually heating said compartments, doors for the several compartments and additional means for preventing the heat from escaping from one compartment into another, consisting of seals located at the tops and bottoms of the doors and containing soft non-conducting material.

5. In a baking oven, a fire-box, a baking chamber adjacent thereto and divided into superposed compartments, receptacles for liquid arranged in pairs in such compartments respectively and extending at one end into said fire-box, the lower receptacle of each pair thus extending farther than the upper receptacle, and stirrups arranged for holding the upper receptacles of the several pairs to prevent them from warping.

Signed at New York city, N. Y., this 20 day of December, 1916.

HENRY JANDER.

Witnesses:
 MAURICE BLOCK,
 EDWARD A. JARVIS.

Copies of this patent may be obtained for five cents each, by addressing the "Commissioner of Patents, Washington, D. C."